US007831396B2

(12) United States Patent
Voigtlaender et al.

(10) Patent No.: US 7,831,396 B2
(45) Date of Patent: Nov. 9, 2010

(54) METHOD AND DEVICE FOR PREDICTING A LIFE EXPECTANCY OF A PRODUCT CONTAINING A PLURALITY OF COMPONENTS

(75) Inventors: Klaus Voigtlaender, Wangen (DE); Johannes Duerr, Reutlingen (DE); Rolf Becker, Pfullingen (DE); Reinhold Muench, Oberriexingen (DE); Ivica Durdevic, Reutlingen (DE); Uwe Wostradowski, Malmsheim (DE); Christopher Hahn, Gomaringen (DE); Joerg Breibach, Reutlingen (DE); Philippe Jaeckle, Gerlingen (DE); Hendrik Ehrhardt, Ditzingen-Schoeckingen (DE); Thomas Rupp, Herrenberg (DE); Antoine Chabaud, Stuttgart-Stammheim (DE)

(73) Assignee: Robert Bosch GmbH, Stuttgart (DE)

( * ) Notice: Subject to any disclaimer, the term of this patent is extended or adjusted under 35 U.S.C. 154(b) by 118 days.

(21) Appl. No.: 11/793,342

(22) PCT Filed: Nov. 25, 2005

(86) PCT No.: PCT/EP2005/056217

§ 371 (c)(1),
(2), (4) Date: Jul. 24, 2008

(87) PCT Pub. No.: WO2006/063923

PCT Pub. Date: Jun. 22, 2006

(65) Prior Publication Data
US 2009/0119029 A1 May 7, 2009

(30) Foreign Application Priority Data
Dec. 16, 2004 (DE) .................... 10 2004 060 528

(51) Int. Cl.
G06F 19/00 (2006.01)
G01B 3/44 (2006.01)

(52) U.S. Cl. .............. 702/34; 324/158.1; 324/763; 340/653; 700/21; 702/185; 702/189; 714/25; 714/47

(58) Field of Classification Search .............. 702/34, 702/185, 189; 714/25, 47; 324/158.1, 763; 700/21; 340/653
See application file for complete search history.

(56) References Cited

U.S. PATENT DOCUMENTS 5,210,704 A * 5/1993 Husseiny ................... 702/34
(Continued)

FOREIGN PATENT DOCUMENTS

JP 3070069 3/1991
(Continued)

OTHER PUBLICATIONS

Bond et al., 'Fatigue Properties of Jointed Wood Composites: Part II Life Prediction Analysis for Variable Amplitude Loading', 1998, Journal of Material Science, pp. 4121-4129.*
(Continued)

Primary Examiner—Eliseo Ramos Feliciano
Assistant Examiner—Elias Desta
(74) Attorney, Agent, or Firm—Kenyon & Kenyon LLP

(57) ABSTRACT

A method and a device are for predicting a life expectancy of a product, which includes at least two components. The life expectancy is ascertained as a function of an assumed field loading of the product. The components of the product are acted upon by different loadings and are operated, in each instance, at the different loadings until they fail. An end-of-life curve of the component is recorded on the basis of the load-dependent failure times of a component. An EOL curve of the product is ascertained such that at the different loadings, it includes the EOL curve of the components which has, in each instance, the shortest failure time at the corresponding loading. The anticipated service life of the product is determined as a functional value of the EOL curve of the product as a function of the predefined loading of the product.

14 Claims, 10 Drawing Sheets

U.S. PATENT DOCUMENTS

| | | | |
|---|---|---|---|
| 6,075,724 A * | 6/2000 | Li et al. | 365/185.18 |
| 6,873,917 B2 | 3/2005 | Tsuji | |
| 7,515,962 B2 * | 4/2009 | Lyden | 607/29 |

FOREIGN PATENT DOCUMENTS

| | | |
|---|---|---|
| JP | 6337882 | 12/1994 |
| JP | 11-211622 | 8/1999 |
| JP | 2002141388 | 5/2002 |
| JP | 2003314345 | 11/2003 |
| JP | 2004-219954 | 8/2004 |

OTHER PUBLICATIONS

Page, 'Probability for Engineering: with applicaiton to reliability', 1989, Computer Science Press, pp. 199-208.*

Written Opinion of the International Searching Authority, PCT International Patent Application No. PCT/EP2005/056217, dated May 9, 2006 (English-language translation provided).

International Search Report, PCT International Patent Application No. PCT/EP2005/056217, dated May 9, 2006.

* cited by examiner

US 7,831,396 B2

METHOD AND DEVICE FOR PREDICTING A LIFE EXPECTANCY OF A PRODUCT CONTAINING A PLURALITY OF COMPONENTS

FIELD OF THE INVENTION

The present invention relates to a method and a device for predicting a life expectancy of a product, which includes at least two components. The life expectancy is determined as a function of a predefinable loading of the product.

The present invention also relates to a computer program, which is executable on a computing element, in particular on a microprocessor, of a data-processing system.

BACKGROUND INFORMATION

In different technical fields, products are employed or utilized that have a specific service life as a function of the loading to which they are subjected to during their operation. A product encompasses a plurality of components. A product may be a personal computer (PC), the components then being the electrical components (power supply, main board, hard disk, disk drive, CD-ROM drive, DVD drive, etc.) of the PC. It would also be POSSIBLE, for example, to regard the main board as the product, the different electrical components, soldering points, etc. on the board then being the components. A product could also be any motor-vehicle component, in particular a motor-vehicle control unit, the components then being the different electrical components (e.g., resistors, capacitors, inductance coils, operational amplifiers), soldering points, circuit traces, etc.

The service life of a product is a strong function of the loading, to which the product is subjected during its life. For instance, a motor-vehicle control unit, which is situated in the vicinity of an internal combustion engine of a vehicle, is subjected to a substantially higher thermal loading than a control unit situated in the passenger compartment of the vehicle. The thermal loading may be an absolute temperature, but also a temperature fluctuation. The same control unit would therefore have a shorter service life in the region of the engine than in the passenger compartment. The same also applies to mechanical and chemical loadings, as well as to any other form of loading.

It is conventional that a reliability verification can be produced for a product by subjecting it to a specific, predefinable, absolute or cyclical loading for a particular, specifiable period of time, or at predefinable intervals. Therefore, to provide a reliability verification, it is determined whether a product or the components of the product is/are able to withstand a predefinable loading for a specifiable period of time.

Such reliability verifications are provided according to manufacturer-specific or customer-specific standards, or according to legally prescribed standards. To provide the verification for a product, the product should ideally be subjected to the loading to which it will be subjected within the scope of its intended use or application over a required minimum service life. If the product survives under such loading for the minimum service life, then the reliability verification for this product has been established. If it fails prior to reaching the minimum service life, the verification is not able to be produced. The testing to supply the verification may be implemented on a multitude of products having the same design, so that the result of the verification is more representative.

However, due to time restraints, it is usually impossible to run through the entire required minimum service life of the product (e.g., 15 to 20 years in the case of a motor-vehicle control unit) in real time, under the loadings occurring within the scope of its normal use or application. For this reason, it is conventional that the loadings can be increased beyond the loadings likely to occur, and that the testing period can be reduced in exchange. This is also referred to as an accelerated reliability verification.

However, the precise relationship between increased loading and shortened testing period is not known and may behave completely differently for different loadings and for different products. Furthermore, this procedure results in an accumulation of errors that are a result of the increased loadings and, in reality, do not occur during normal operation or use of the product. Such errors are also called errors irrelevant to field conditions. On the other hand, due to the shortened testing duration, certain errors that occur in reality as a result of long-term, but lower-magnitude loadings, may not occur during the shortened testing period. In other words, the shorter the testing time, the further removed the result of the verification is from reality or field conditions. That is to say, there is a conflict of goals between the shortening of the testing duration on the one hand and the effectiveness of the test results' simulation of field conditions on the other hand.

After the testing of a multitude of identical components, the conventional method provides statements, such as: "At absolute operating temperatures of above 90° C., there is a 97% probability of the product achieving a minimum service life of 5,000 hours of operation." However, the conventional method cannot provide any statements beyond that. Such statements relate, for instance, to questions as to how long the life expectancy of the product is at a predefined loading; how long the product functions at a lower or higher loading; and which components have to be dimensioned in a certain manner for the product to achieve a higher minimum service life (which components must be built more robustly?) or to be able to be manufactured in a more cost-effective manner (which components can be built less robustly?).

SUMMARY

Example embodiments of the present invention may provide a method and a device, such that a particularly meaningful reliability verification is able to be provided for the product and the service life of the product may be determined within the shortest time possible, and while simulating field conditions as closely as possible.

The following method steps may be provided the components of the product are acted upon by different loadings;

in each instance, the components are operated at different loadings until they fail;

the resulting failure times are stored for the particular component as a function of the loading;

an end-of-life (EOL) curve of the component is plotted as a function of the load-dependent failure times of a component;

an EOL curve of the product is ascertained, so that it includes, at different loadings, the EOL curve of the components that has, in each instance, the shortest failure time at the respective loading; and the anticipated service life of the product is determined as a functional value of the EOL curve of the product, as a function of the predefined loading of the product.

Thus, example embodiments of the present invention initially provide for each component of a product to be viewed individually. Using the EOL curves plotted for the individual components, an EOL curve is determined for the entire product. At the various loadings, it always corresponds, so to speak, to the EOL curve of the worst component, i.e., the component having the shortest service life at a specific loading. This results from the view that a product fails in its entirety as soon as only one of the components breaks down.

Consideration of the individual components provides that in the event that the structure of the product is changed (one component being exchanged for another, a component being omitted, a new component being added), it need not be ascertained again for the entire product whether the product is able to withstand the predefined loading for the specified time period. It is sufficient for the EOL curve to be plotted for the new or modified component and taken into account when determining the EOL curve of the entire product. When omitting a component, the EOL curve of the omitted component is simply no longer considered when determining the EOL curve for the product.

When plotting the EOL curve for one of the product's components, the EOL curve of the component may simply be drawn through the values ascertained for the load-dependent failure times for this component or be approximated to these values. The points of the EOL curve of a component between the ascertained values for the load-dependent failure times of the component may be interpolated according to arbitrary methods. The EOL curve may be extrapolated at the edge, i.e., the beginning and the end.

The method according to example embodiments of the present invention allows the durability of a product to be checked particularly rapidly, especially if the EOL curves for the individual components have already been plotted in advance of the testing, stored in a database, and merely need to be retrieved as required. In addition, the method according to example embodiments of the present invention allows failures irrelevant to field conditions due to excessive loading to be prevented for the reliability verification. The various loads that are applied to the individual components are for the most part within the range of an assumed field loading, or only slightly above it. The durability of the product, i.e., whether the product is able to withstand the specified loading for the predetermined period of time, is thus tested using loadings that could actually occur in the field during operation of the product.

Using example embodiments of the present invention, the application of the assumed field loading to the components or the entire product is separated, so to speak, from the determination of the service life of the product and from the durability testing. While the assumed field loading may be applied to the components in advance of the actual determination of the service life and/or reliability of the product, during the execution time of the method hereof, the actual determination of the service life of the product takes place on the basis of the EOL curves ascertained in advance.

A further advantage of considering the individual components is that it is possible to use the EOL curves for the individual components to check if the components are capable of withstanding the assumed field loading. If a component is unable to withstand the field loading, this is immediately detected on the basis of the EOL curve of the component, and the component may then be selectively exchanged for a sturdier one. On the other hand, it is also possible to replace components, which are clearly much sturdier than actually required (since the EOL curve of these components is considerably above the assumed field loading), with less sturdy, less expensive components without running the risk of the product no longer being able to withstand the assumed field loading.

Using the EOL curve of the product, example embodiments of the present invention allow an assumed field loading (according to the magnitude of the loading and the duration of the loading) to be ascertained, which in turn allows optimal testing of the reliability of the product from the standpoint of minimizing the testing duration and the failures irrelevant to field conditions. To this end, the assumed field loading is selected such that the duration of the loading has a representative value (this corresponds to approximately 50 to 3,000 cycles). The value for the field loading is selected as the loading at which the selected duration of loading is just below the EOL curve of the product. This establishes the duration and the loading for optimal testing conditions. It is not necessary to carry out the test, for safety reasons, at a higher loading going beyond this, or for a time period longer than the one ascertained.

The method according to example embodiments of the present invention is not only suitable for determining the service life of the product (how long does the product withstand a predefined loading?) but may also be used to provide a verification of the product's reliability (does the product withstand a predefined loading for a predefined period of time?). Therefore an example embodiment of the present invention provides for the method to be used for producing a reliability verification for the product, and for it to be checked whether the EOL curve of the product lies above a predefined loading for a specifiable period of time. The reliability verification for the product is considered to be provided if the EOL curve of the product is above the loading in the reliability verification. In this case, at the predefined loading, the failure of the component thus occurs at a later time than the component must withstand at this loading according to the requirements of the verification.

According to an example embodiment of the present invention, it is provided that the EOL curves of the components be extrapolated to lower loadings. At low loadings, in particular, a very long operating time of the component until failure may possibly result, i.e., the test duration may be very long. The further refinement allows the test duration to be reduced by and the verification to be consequently accelerated, as the failure time of the components at higher loads is plotted and extrapolated out to smaller loads and greater test durations. There are a number of conventional extrapolation methods. For instance, it is possible for an approximation function to be drawn through the plotted failure times at different loadings, the approximation function being extended beyond the plotted failure times to lower loadings and longer test durations. For example, an arbitrary exponential function ($e^{(A+B \cdot x)}$; $A(1-e^{(-B \cdot x)})+C$; $A \cdot e^{(B/x)}$) may be considered as an approximation function or an xth-order adjusting polynomial.

According to an example embodiment of the present invention, it is provided that the EOL curves of the components be interpolated between the discrete values for the failure times at specific loads, at which the EOL curves were plotted. Using the example embodiment, the number of component tests to be executed (operation of the component at a specific loading until failure of the component) may be reduced, in that the failure time of the component is only plotted at a few discrete loadings and the EOL curve is interpolated between them. There are a number of conventional methods for interpolation. For instance, it is possible for an approximation function to be joined through the plotted failure times at different loadings, the approximation function being, for instance, an arbitrary exponential function, a spline function, or an xth-order adjusting polynomial.

The loading of the component may be any type of loading, in particular mechanical, thermal, chemical, electrical, magnetic or electromagnetic loading. Any type of loading acts to change, usually to shorten, the service life of the component in question. However, the loading may be a specific absolute operating temperature of the component and/or a temperature fluctuation of a specific magnitude within a specific period of time. Apart from mechanical loadings, these are the most frequent and highest loadings for products used in the automotive branch.

The failure time of the components of the product is plotted at various discrete loadings. The EOL curve may be interpolated between the plotted failure times and extrapolated on the other side of the plotted failure times. One also speaks of different loading classes, at which the failure times of the components are recorded. The manufacturer of a product receives specific requirements from his customer as to which loading class the product has to withstand for how long. For instance, if the loading is the operating temperature of the components, the failure times of the component in different discrete temperature classes. A first temperature class may include the temperature range of 100° C. to 120° C., a second temperature class may include the range of 120° C. to 140° C. According to the requirements of the customer, the product must, for example, be able to operate 120 hours in the first temperature class and 20 hours in the second temperature class. If, for example, the tested product is able to be operated for 150 hours in the first temperature class until failure, but only for 10 hours in the second class until failure, the product or a component of the product does not meet the customer's requirements. At least the underdesigned component must be replaced by a sturdier one. Even if the product can be operated 25 hours in the second temperature class until failure, i.e., longer than specified by the customer, this may still result in the permissible loading of the product being exceeded overall, if it fails before reaching an exemplary, minimum service life of 180 hours required by the customer.

In order to be able to determine this, an example embodiment of the present invention provides that in each loading class, the distance of the duration of a predefined loading (e.g., the assumed field loading) of a component to the corresponding value on the EOL curve of the component, i.e., the corresponding failure time of the component, be determined and added up according to Palmgren-Miner. According to the so-called Palmgren-Miner cumulative damage hypothesis, the quotients of the value of the duration of a predefined loading of the component and the corresponding failure time are added up for all loading classes. The component only satisfies the requirements if the sum is less than 1. If the sum is greater than or equal to 1, premature failure of the component is to be expected.

If the customer of a product manufacturer specifies, as a reliability verification, a particular loading that the product has to withstand for a likewise predefined period of time (so-called loading in the reliability verification) with the aid of the method according to example embodiments of the present invention, it is easily verifiable that the product is able to produce the reliability verification. First of all, the EOL curve of the product is ascertained. Then, cumulative damage according to Palmgren-Miner is determined. Using the EOL curve of the product, it is even possible to determine a loading different from (usually higher than) that specified by the customer, which has to be applied to the product for a shorter time period in order to still satisfy the required reliability verification. In this manner, the required time for producing the reliability verification may be reduced without reducing the meaningfulness of the verification.

The finished product is subjected to a specific loading profile over its entire service life, i.e., the product is acted upon by different loading classes for, in each instance, a specific period of time. For reasons of time, it is not possible to run through the actual loading profile in order to produce a reliability verification. This is why accelerated tests are used in which the loading is increased and the duration of the test is correspondingly reduced. In order to achieve, even in the case of accelerated tests, as realistic as possible a simulation of a thermal loading of the product over its life cycle, it is provided that an accelerated reliability verification be carried out at a specific temperature above a specifiable field loading of the product, for a particular period of time less than the duration of the field loading; the particular temperature and the particular period of time being adjusted to one another in such a manner, that a mechanical loading of the product and a thermomechanical loading of the product are accelerated by approximately the same factor.

An EOL curve of a component may include at least two points that result from the failure times of the component at different loadings. If, for example, the loading is the operating temperature of the component, the failure time of the component is therefore recorded at least two different discrete temperatures or in at least two different temperature classes, such as at 100° C. and at 175° C.

It may be provided that the device includes:
 a device for loading an end-of-life (EOL) curve for at least one of the components, the EOL curve having been plotted in advance as a function of ascertained, load-dependent failure times of the component;
 a device for determining an EOL curve of the product, so that at different loadings, it includes the EOL curve of the components that has the shortest failure time at the corresponding loading; and
 a device for determining the anticipated service life of the product as a functional value of the EOL curve of the product, as a function of the predefined loading of the product.

The EOL curves for the components of the product are plotted before the service life of the product is ascertained. To plot the EOL curves of the components, each component is individually subjected to different loads and operated until failure of the individual component. One could also say that the components are operated in different loading classes until failure occurs. This produces load-dependent failure times for each component, which form the interpolation points of the EOL curve of the component. These interpolation points are stored. For the actual determination of the service life of the product, the stored interpolation points of the EOL curves for the product's components are simply called up, and the EOL curves are determined by interpolation and/or extrapolation and used for determining the life expectancy of the product.

However, it is also possible for the interpolation points to be interpolated or extrapolated in advance, and for the complete EOL curves for the components to be stored. The complete EOL curves for the components of the product are then immediately available for actually determining the service life of the product, without still having to initially interpolate between, or extrapolate on the other side of, the interpolation points during the running time.

It may be provided that the at least one EOL curve for a component be plotted in advance by a manufacturer of the component as a function of ascertained, load-dependent failure times of the component. The EOL curve of a component may then be provided to a manufacturer of the entire product on a data sheet or online, for example. Then, based on the EOL curves of the various components that the product manufacturer may possibly receive from different manufacturers, he is then able to determine the EOL curve of the entire product and check whether the overall product satisfies the requirements set by his customers.

Furthermore, it may be provided that the device be used to produce a reliability verification for the product and have a device for checking whether the EOL curve of the product lies above a predefinable loading for a predefinable time period, and if this is so, the reliability verification for the product is deemed established.

The method according to example embodiments of the present invention may be implemented in the form of a computer program that is able to run on a computing element, e.g., on a microprocessor or a microcontroller. The computer program runs on the computing element and executes the method fully automatically. Thus, example embodiments of the present invention are implemented by the computer program, so that this computer program represents an example embodiment of the present invention in the same manner as the method, for the execution of which the program is programmed. The method is subdivided into two parts. A first part is responsible for plotting the EOL curves for the individual components of the product. This may be done by the manufacturers of the components, for instance. A second part of the method is responsible for determining the EOL curve for the entire product and for determining the life expectancy of the product. This may be done, for example, by the manufacturer of the product who bases his calculations on EOL curves for the components received from the manufacturers of the components.

If one assumes that in the future, EOL curves will normally be plotted for each manufactured component and provided to customers, the second part of the method, in particular, becomes especially important. For, according to this, it will be possible in the future to produce reliability verifications and estimate the service life for any product in a rapid, simple and particularly reliable manner. Modifications or adaptations of the product may be incorporated rapidly and easily into the reliability and service-life calculation.

Example embodiments of the present invention are explained in more detail in the following with reference to the appended Figures.

DETAILED DESCRIPTION

Figure 1:
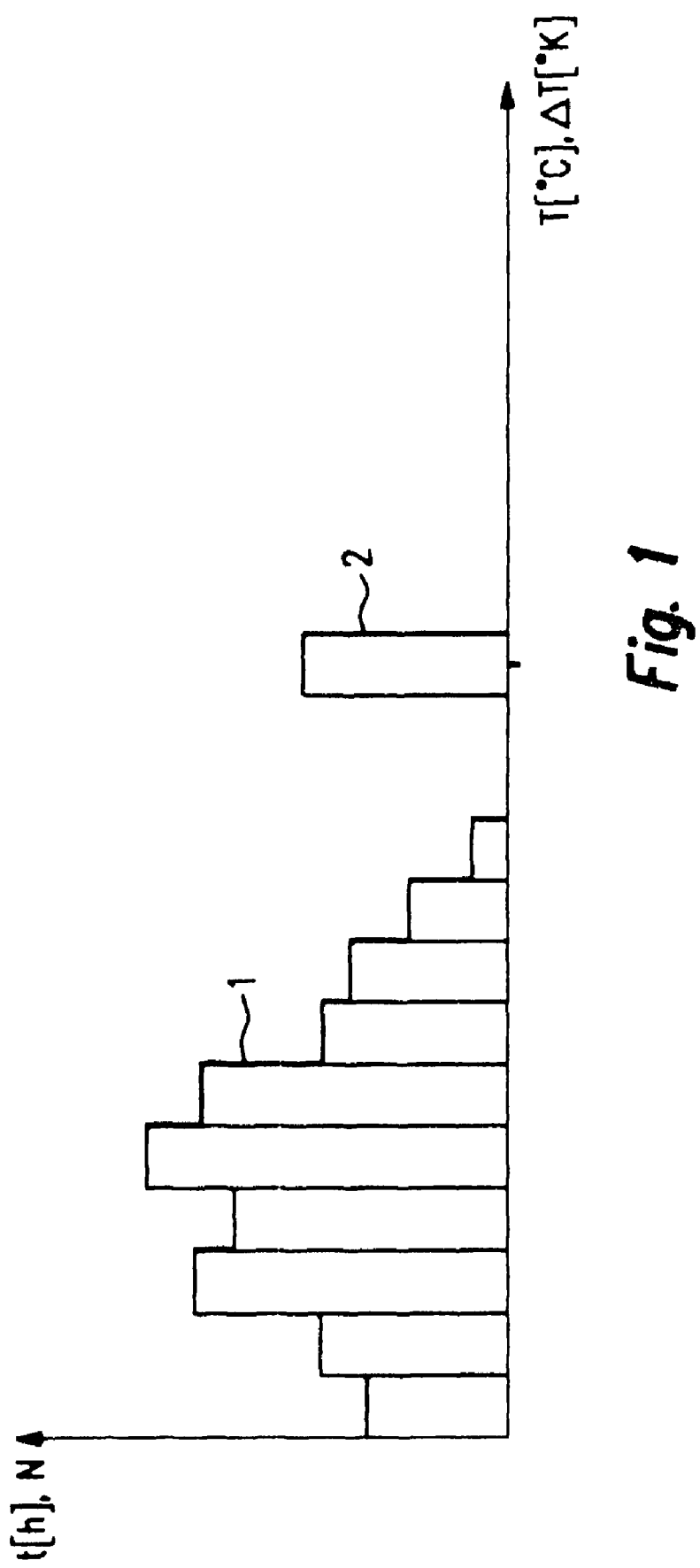
FIG. 1 illustrates a conventional method for producing a reliability verification for a product at a specific, assumed field loading.

Conventionally, the testing of products or reliability verifications for products are implemented based on standards and standardized methods provided by customers or standardization committees. Described in these standards are accelerated tests that must be conducted on a product up to a specific operating time t or a specific number of cycles N, in order to be able to verify the reliability of the product. A test is referred to as accelerated tests, if it is carried out at higher loadings than the loadings that occur in the field, but only for a reduced time t or number of cycles N. The evaluation criterion for passing the reliability test is then generally the proof that the product functions after conclusion of the test. In this manner, a Yes or No assertion may be made as to whether or not the product withstands the required loading over the required period of time. However, an assertion regarding the service life of the product under an arbitrary loading cannot be made in this manner.

The tests are accelerated by selecting the loading acting on the tested products to be higher, sometimes even considerably higher, than an assumed field loading for the product. However, this results in more and more errors irrelevant to field conditions arising in the reliability verification with increasing loading. That is to say, failures occur that do not arise during normal operation of the product in practice. In other words, the meaningfulness of the test used in the field decreases with increasing loading in the reliability verification. The result is that the products or the components of the products are designed to be substantially more robust and durable in order to still be able to definitely produce the reliability verification at the increased loading, i.e., in order to also prevent the occurrence of failures of the product not relevant to field conditions during the reliability verification. However, this entails additional weight, additional volume and, above all, increased component costs.

On the other hand, if the loading in the reliability verification were reduced so that fewer failures irrelevant to field conditions occur during the test, a considerable increase in the required testing time would result. In practice, it has thus always been attempted to find a suitable compromise between the shortest possible test duration on the one hand and the lowest possible number of failures irrelevant to field conditions on the other hand.

More recently, due to the increased demands on quality, the longer required service lives of the products and the increased loadings to which the products are subjected during practical operation, customers are placing more and more rigorous demands regarding the reliability verifications. This leads to increased testing costs and testing times, as well as to failures during the trial, due to failures irrelevant to field conditions. This often has the result that products must be improved shortly before the start of production, since the required reliability verification cannot be produced and the customer refuses release of the product. Complicated recursions (redesign of the entire product) take place as a function of the improving, the quality of the product often being poor due to the time pressure then prevailing.

An example of a conventional reliability verification is described in FIG. 1. The customer specifies the reliability test or the conditions (loading and duration of loading), under which the test has to be carried out. In FIG. 1, assumed field loading (AsFL) is denoted by reference numeral 1, and the loading during the reliability verification (LRV) specified by the customer is denoted by reference numeral 2. The loading is plotted on the x-axis in the form of an operating temperature T or an operating temperature change $\Delta T$, and the loading duration is plotted on the y-axis as time t or number of cycles N.

Assumed field loading 1 corresponds to a normal operational loading of the product, which is estimated or empirically determined via trials. Loading 2 in the reliability verification is an estimated loading that lies above assumed field loading 1. Loading 2 in the reliability verification is selected such that, if the product is still able to function following trial operation for the specified duration at loading 2 in the reliability verification, it may be assumed that the product would also be able to withstand practical use at assumed field loading 1 for the desired time period.

In the exemplary embodiment shown, the loading takes the form of absolute operating temperature T or as temperature change $\Delta T$. Of course, any other types of loading are conceivable as well. For operating temperature T, the duration of loading corresponds to a time t. For temperature change $\Delta T$, the loading duration corresponds to number of cycles N, which indicates how often a specific temperature change $\Delta T$ will be run through.

Figure 2:
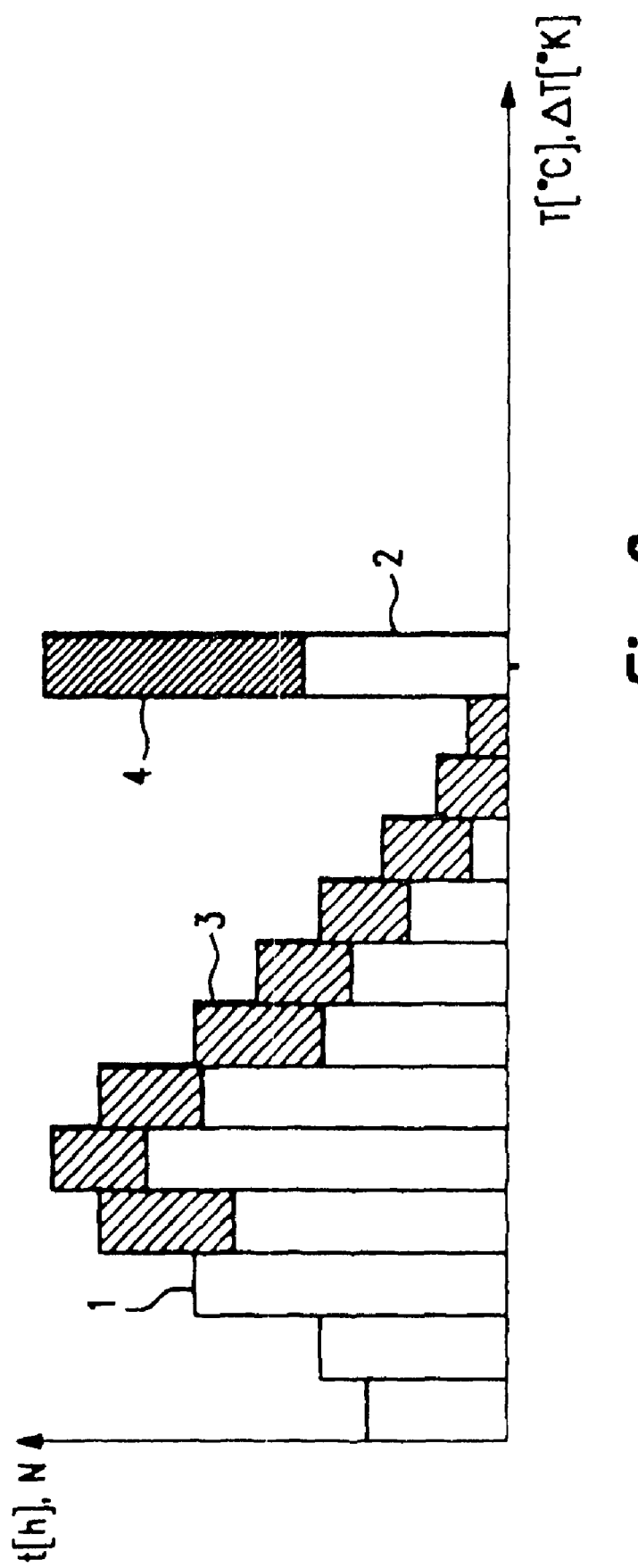
FIG. 2 illustrates a conventional method for producing a reliability verification at an assumed field loading that is higher than in the exemplary embodiment from FIG. 1.

If assumed field loading 1 were to increase, for instance, due to more stringent quality demands, problems would arise for the method illustrated in FIG. 1. FIG. 2 shows the case in which assumed field loading 1 has been extended by an additional time period 3 at different loading values. In order to account for this increased, assumed field loading 1, 3, loading 2 in the reliability verification is increased by an additional time period 4, i.e., the product must be operated for a longer period of time at loading 2 in the reliability verification. However, this leads to an unreasonable increase in the testing duration, which is not practical in practice.

Figure 3:
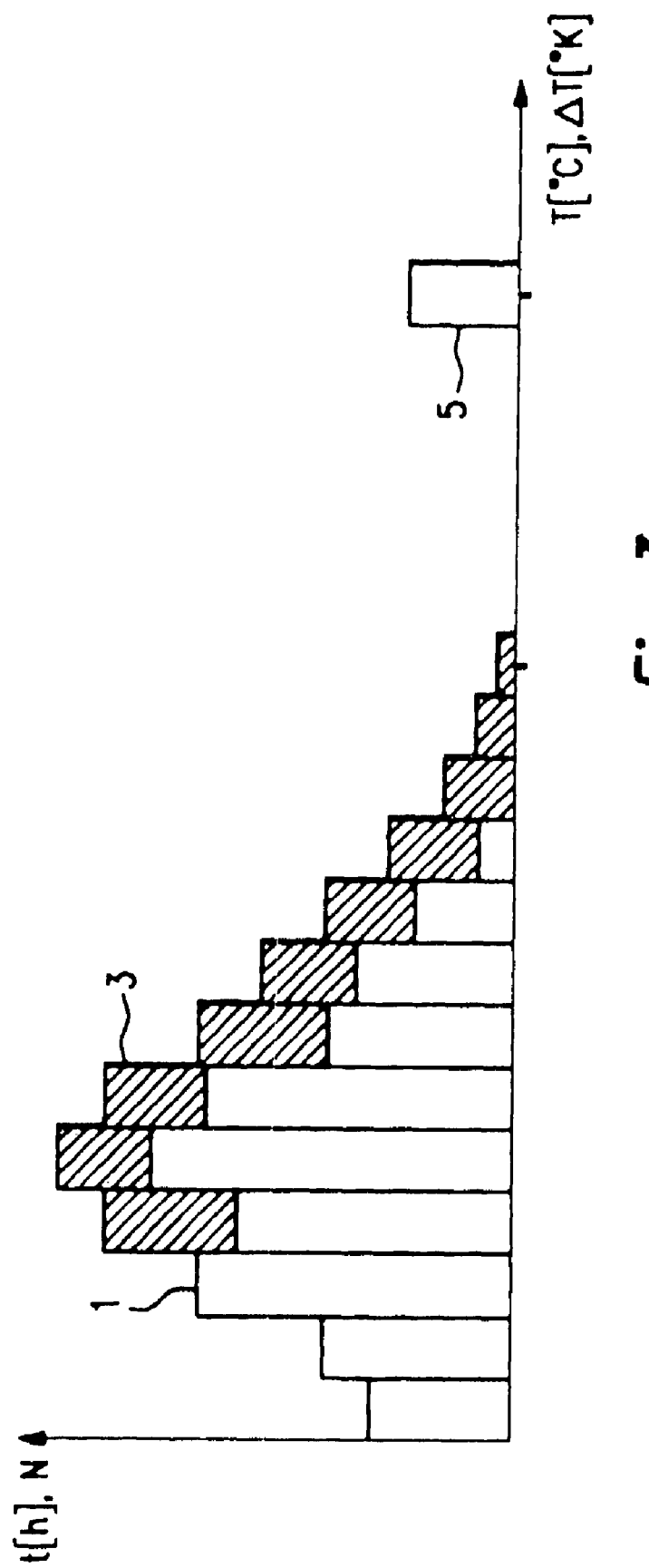
FIG. 3 illustrates a conventional method for producing a reliability verification at an assumed field loading that is higher than in the exemplary embodiment from FIG. 1.

In the second exemplary embodiment shown in FIG. 3, additional, increased field loading 1, 3 is taken into account by not increasing the duration of the reliability verification, but by increasing loading T, $\Delta T$. This is shown in FIG. 3 by new loading 5 in the reliability verification. In this context, however, it is disadvantageous that due to loading 5 in the reliability verification being far above field loading 1, 3, there may be more failures irrelevant to field conditions during the testing phase of the product. The failure mechanism irrelevant to field conditions may prevent release of the product, although they do not occur in practical operation. Elimination of the failures, which are not relevant to field conditions and usually mean revision or redesign of the product, results in increased production costs. While the test duration is extended (theoretically up to one year) in the conventional method described in FIG. 2, a large number of failures irrelevant to field conditions are produced in the conventional method from FIG. 3, due to the extremely high loadings.

Furthermore, simply increasing the testing times or the loading does not lead to the desired correlation with field loadings 1, 3, since these cannot be analyzed from the initial state. Thus, a service life prognosis is also not possible using conventional methods. Loadings are unable to be laid out in a differentiated manner.

For this reason, example embodiments of the present invention provide a method for determining the service life of a product whose method steps are explained in detail below in view of FIG. 5. An important aspect is that a plurality of components of a product, preferably all components, are initially viewed by themselves. The components of the product are acted upon by a predefined loading. It is not necessary that all components of the products are acted upon, but it may be provided for at least the product components having an effect on the service life of the product be included in the method and thus acted upon by a predefinable loading. The components are each operated at different loadings (so-called loading classes) until failure. Load-dependent failure times are produced for the different components.

Figure 5:
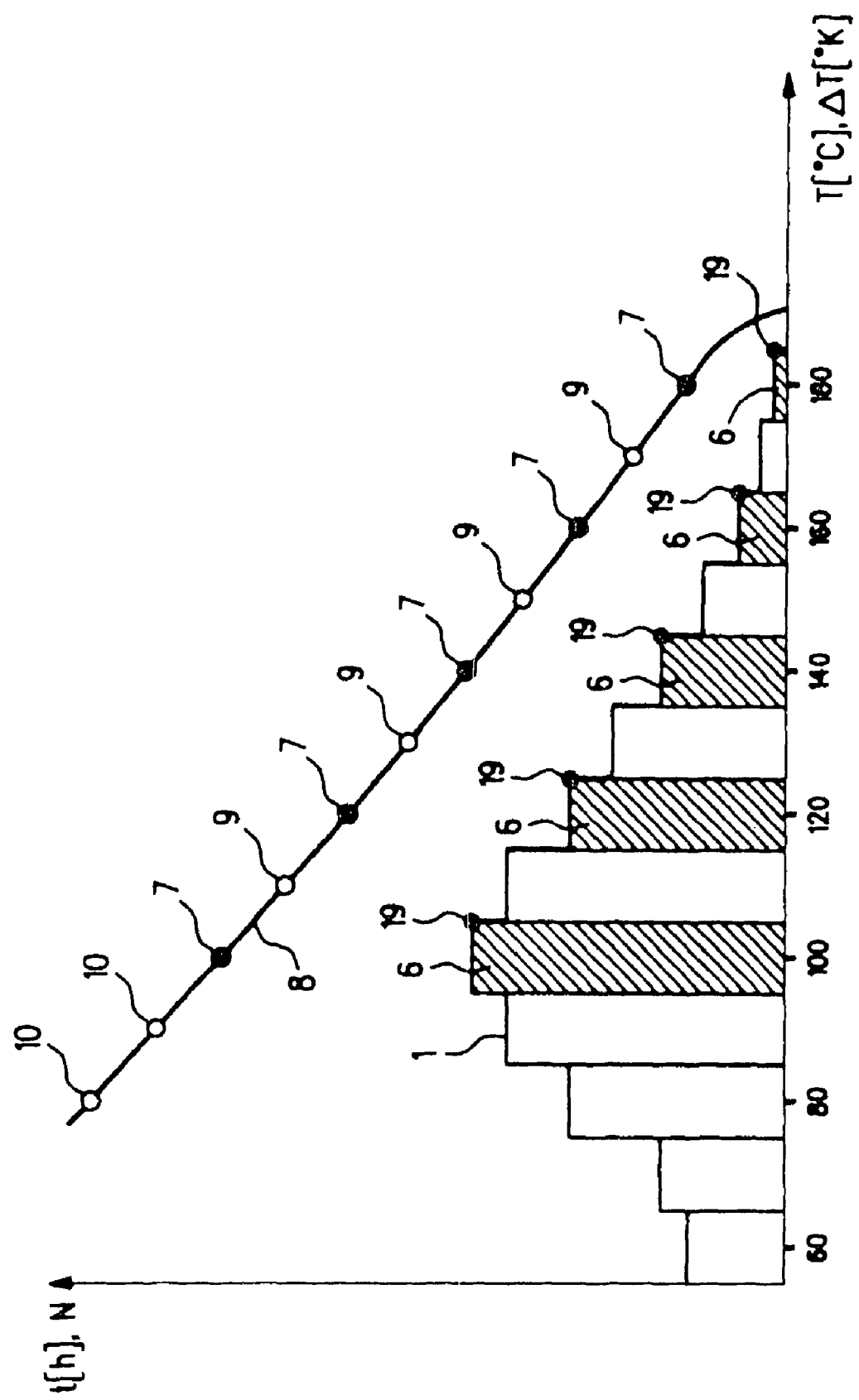
FIG. 5 illustrates an end-of-life curve for a component of a product.

The results of this measurement are shown in FIG. 5 for a specific component. In FIG. 5, the blocks (so-called loading classes) of field loading 1, at which the component is operated until failure, and at which a measurement of the failure times is made, are shown with hatching and are provided with reference numeral 6 These are the loading values 110° C., 120° C., 140° C., 160° C. and 180° C., or 100° C., 125° C., 150° C. and 175° C. or any other equidistant or non-equidistant spacing in the temperature range of interest (for instance, up to 175° C., 200° C. or 233° C.). The measurement of the failure times in each loading class is preferably conducted at the correspondingly highest loading; those are points 19 in FIG. 5. Of course, the measurement may also be taken at an average loading within the particular loading class or at a low loading within the loading class. The measured values for the failure times of the component are shown as points 7. All failure times 7 measured and recorded in this manner lie on a so-called end-of-life curve 8 of the component.

The values of EOL curve 8 between measured failure times 7 are determined by interpolation. A few of the interpolated values are denoted by reference numeral 9 in FIG. 5. The lower the loadings become, the longer the component would actually have to be operated until its failure. In order to avoid testing periods that are too long, the failure times are recorded only up to a minimum loading (up to 100° K or 100° C. in the illustrated exemplary embodiment). In order to additionally obtain the values of EOL curve 8 below this loading, EOL curve 8 is extrapolated over measured failure times 7 in the direction of lower loadings. In FIG. 5, the extrapolated values of EOL curve 8 are denoted by reference numeral 10.

The component is accelerated at different loadings, from close to field conditions to markedly accelerated, i.e., at higher loadings, until failure; the test duration being reduced at higher loadings. In the process, failure modes are analyzed and combined, so that a failure-specific EOL curve 8 is produced for the component, the failure-specific EOL curve allowing correlations with field conditions, i.e., with practical use of the component. Examples of failure modes include: crack formation and creep in solders, diffusion in boundary layers (e.g., Kirkendal in the case of bonding wires), delamination of a so-called mold compound, bond fatigue, increase in a transient thermal resistivity Z_th, leaks in electrolytic capacitors, etc.

Figure 6:
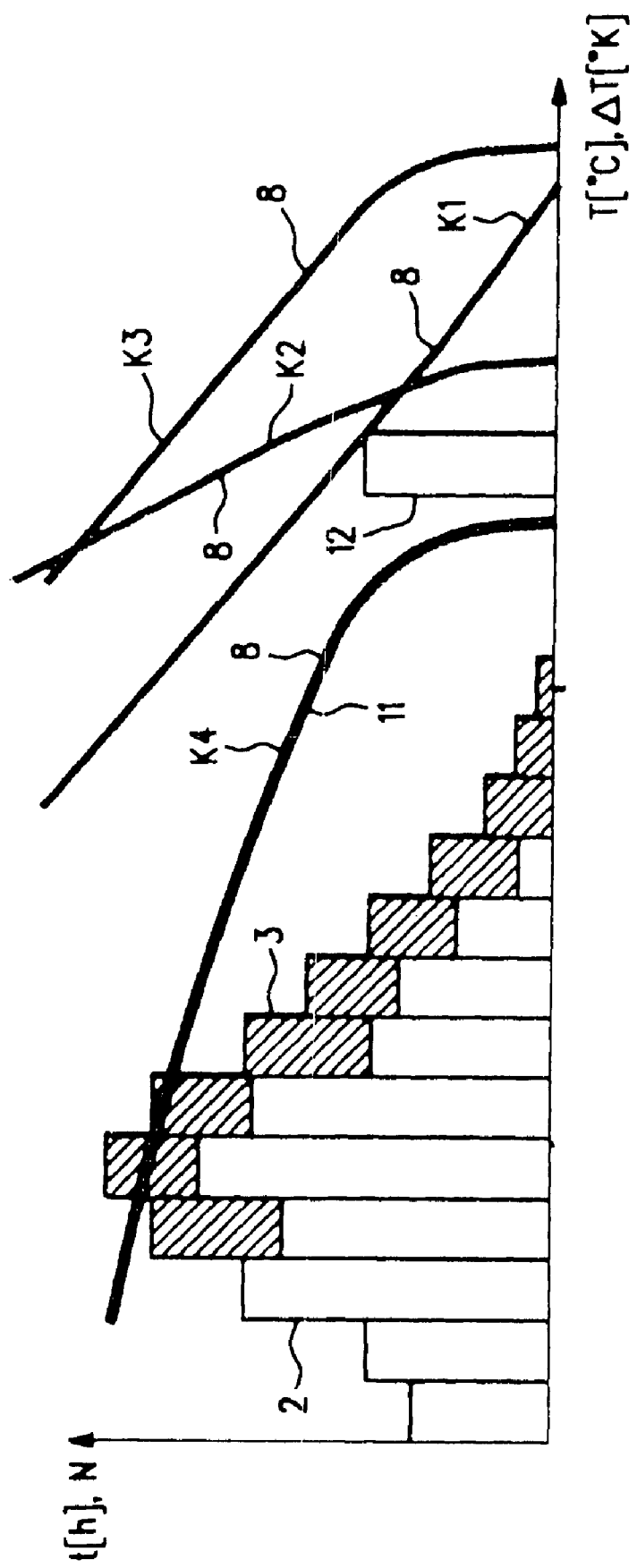
FIG. 6 illustrates end-of-life curves for four components and for a product that is not reliable.
Figure 7:
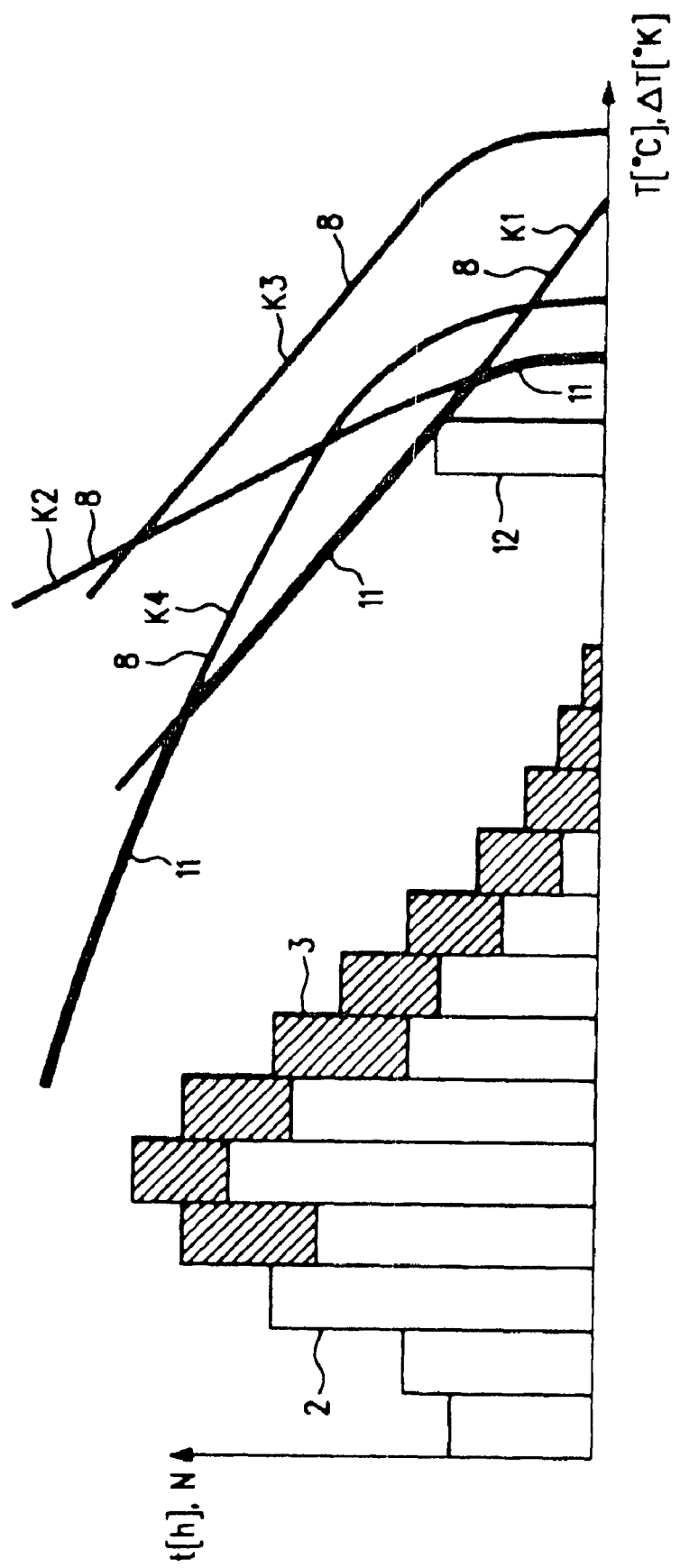
FIG. 7 illustrates end-of-life curve for four components and for a reliable product.

The different failure modes are reflected in different EOL curves 8 of the components, as can be gathered from FIG. 6. Examples of the different EOL curves for four components K1, K2, K3 and K4 are shown there. Of course, the method may be utilized for fewer than four components or for as many components K1, K2, K3 through Kn as desired. FIG. 6 clearly shows that EOL curve 8 for fourth component K4 is unable to withstand a loading approximately in the middle loading range, over the required period of time. Component K4 is therefore unsuited for the planned use in the field. Prior to using the product in the field, component K4 must be replaced by a more robust or durable component. FIG. 7 shows examples of end-of-life curves 8 for four components K1, K2, . . . K4; in the case of the characteristic shown in FIG. 7, component K4 having been replaced by a component K4 more robust and durable than in the case of the characteristic from FIG. 6. In this manner, the unreliable product from FIG. 6 becomes a reliable product (cf. FIG. 7) without a large amount of outlay. In contrast to conventional systems, a detailed failure analysis and complete redesign of the product is not necessary.

It is readily apparent from FIG. 6 that component K4 does not satisfy the demands placed on it, since EOL curve 8 of component K4 intersects assumed field loading 1 or additional field loading 3. Those components of the product that do not satisfy the requirements, e.g., component K4 in FIG. 6, are simply replaced by more robust and/or more durable components (cf. FIG. 7), so that all EOL curves 8 for all components K1 through K4 (or K1 through Kn) lie above assumed field loading 1 plus additional field loading 3.

An EOL curve 11 of the product is ascertained on the basis of EOL curves 8 for different components K1 through K4 (or K1 through Kn). EOL curve 11 of the product always includes EOL curves 8 of those components K1, K2, . . . K4, which have, in each instance, the shortest failure times in the different loading classes. In the exemplary embodiment shown in FIG. 6, EOL curve 8 for fourth component K4 has the shortest failure times in all loading classes. For this reason, EOL curve 11 of the product only includes EOL curve 8 of fourth component K4. Consequently, EOL curve 11 of the product also intersects assumed field loading 1 or additional field loading 3 and therefore does not satisfy the reliability requirements placed on it.

In the exemplary embodiment shown in FIG. 7, EOL curve 11 of the product includes EOL curve 8 of fourth component K4 at low loading classes, EOL curve 8 of first component K1 for medium loading classes, and finally EOL curve 8 of second component K2 for high loading classes. EOL curves 8 of all components K1, K2, . . . K4 and EOL curve 11 of the product all run above, at a distance from assumed field loading 1 or additional field loading 3, so that in a first approximation, it may be assumed that components K1, K2, . . . K4 and the product satisfy the reliability requirements. Therefore, the reliability verification would be produced for all components K1, K2, . . . K4 (or K1, K2, . . . Kn) and thus also for the overall product.

Figure 8:
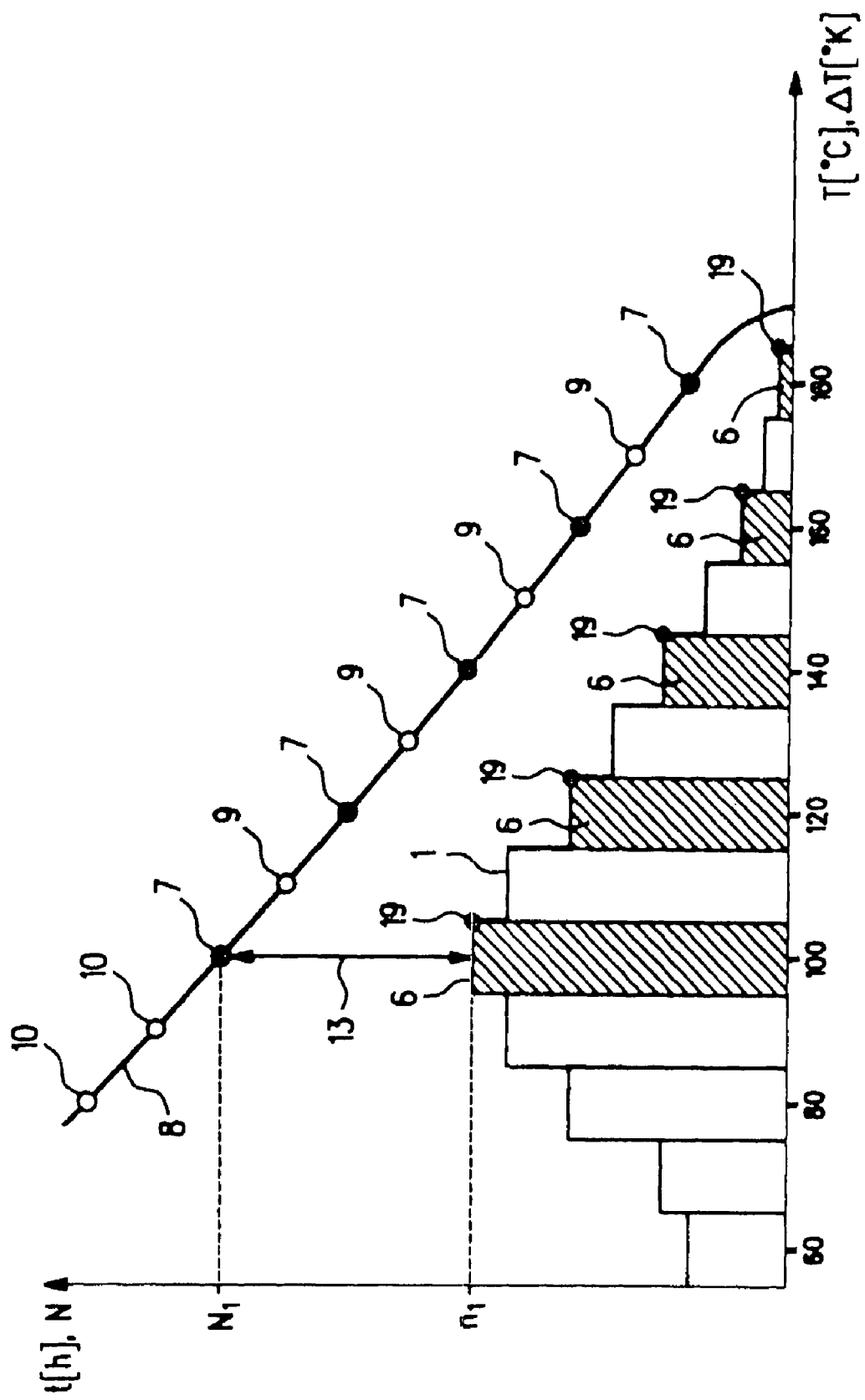
FIG. 8 illustrates the end-of-life curve for a component of a product from FIG. 5, including a distance, plotted in a specific loading class, between a predefined duration of the field loading and the corresponding failure time of the component, to produce a service-life prognosis of the component according to Palmgren-Miner.

However, to have ultimate assurance that the components, whose EOL curves 8 run above at a distance from assumed field loading 1 or additional field loading 3, really satisfy the requirements, a cumulative damage analysis according to Palmgren-Miner may be carried out. This will be explained in detail in the following with reference to FIG. 8. In each loading class (e.g., 60-70° C., 70-80° C., . . . 180-190° C.), distance 13 of the duration (time t or number of cycles N), $N_i$ of the assumed field loading of a component to the corresponding value (of failure time) $N_i$ on EOL curve 8 of the component is determined and added up according to Palmgren-Miner. The corresponding values on EOL curve 8 of the component were either measured (recording of the failure time) (points 7), interpolated between measured values (points 9), or extrapolated beyond measured values (points 10). If sum $S_i$ of the quotients is less than 1, $$\left(S_i = \sum_i \frac{n_i}{N_i} < 1\right),$$

it is a reliable component. However, if sum $S_i$ is greater than or equal to 1, $$\left(S_i = \sum_i \frac{n_i}{N_i} \geq 1\right),$$

the component does not meet the requirements. There is the danger that component K1, K2, . . . Kn prematurely fails prior to reaching its specified minimum service life. Therefore, the component must be replaced with a more robust or more durable component.

An advantage of the method hereof is that the failure-time criteria are set in a product-specific manner and are able to be adapted to the application. The failure-time criteria do not have to be known a priori, but may even be specified even after the end of determining failure times and EOL curves 8, 11 for the components.

Figure 9:
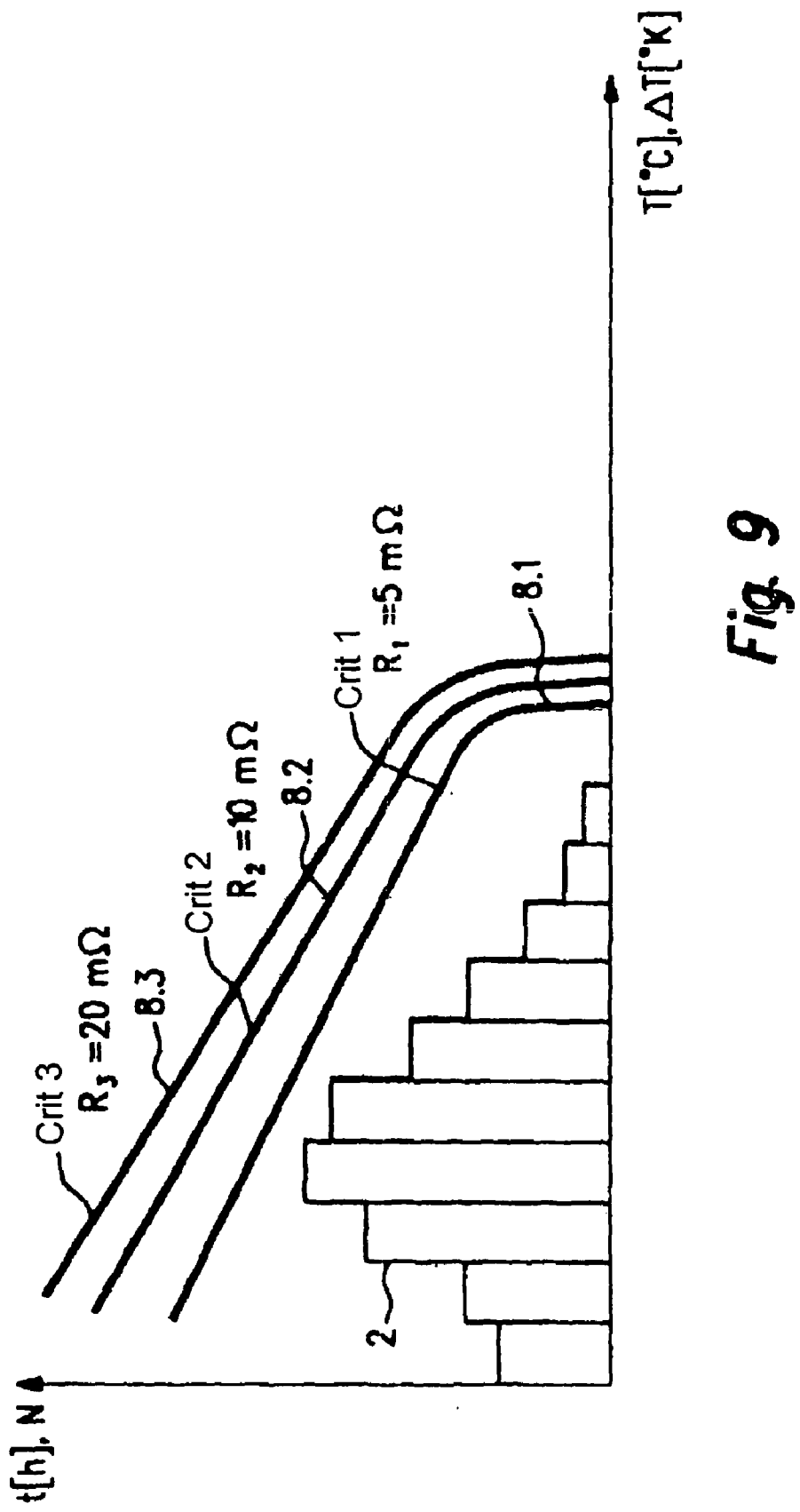
FIG. 9 illustrates options for defining failure time criteria and for designing components of a product.

This is exemplarily shown in FIG. 9 for contact resistances $R_i$ in the field of joining technology. The assumed field loading is once again denoted by reference numeral 2. Different EOL curves 8.1 to 8.3 are illustrated for differently dimensioned transition resistances $R_i$. Different EOL curves 8.1 to 8.3 have different safety margins from assumed field loading 1. If, for example, a control unit (product) in which transition resistor $R_i$ (component) is used for which the various EOL curves 8.1 through 8.3 are illustrated in FIG. 9, is to be used in a warmer environment than originally planned, or closer to the internal combustion engine, transition resistor $R_i$ should preferably be configured according to the criterion crit3 with $R_3=20$ mΩ, so that the safety distance of EOL curve 8.3 from assumed field loading 1 is sufficiently large.

However, if it can be ensured that the component is exclusively used in the intended environment, so that the actual field loading will not substantially exceed assumed field loading 1, transition resistor $R_i$ may also be easily configured according to crit1 with $R_1=5$ mΩ. Using example embodiments of the present invention, it is thus possible, in each instance, to select the optimal components and accordingly assemble the product as a function of the intended use or as a function of changing field conditions.

Example embodiments of the present invention allow conversion of customer-specific loading profiles into a corresponding service life of the product; preventive statements about the service life are possible.

Using example embodiments of the present invention, not only may a product be tested for reliability, but also optimal loading 12 may be ascertained for the reliability verification. What constitutes a considerable problem in conventional systems, namely ascertaining loading 12 in the reliability verification (cf. FIG. 2: relatively low loading 2, 4, therefore too time-consuming; cf. FIG. 3: relatively high loading 5, therefore output of failures irrelevant to field conditions), may be executed without a problem. Loading 12 in the reliability verification must be selected such that it is below EOL curve 11 of the product. Furthermore, it should be ensured that the test duration is selected to be long enough (for instance, between 50 and 3,000 hours or cycles N) so that the test result is representative. In the future, these products could be tested using loading 12 ascertained in this manner for the reliability verification, in which case it would be ensured that the testing is as brief as possible, and that the occurrence of failures irrelevant to field conditions is prevented as much as possible.

Figure 10:
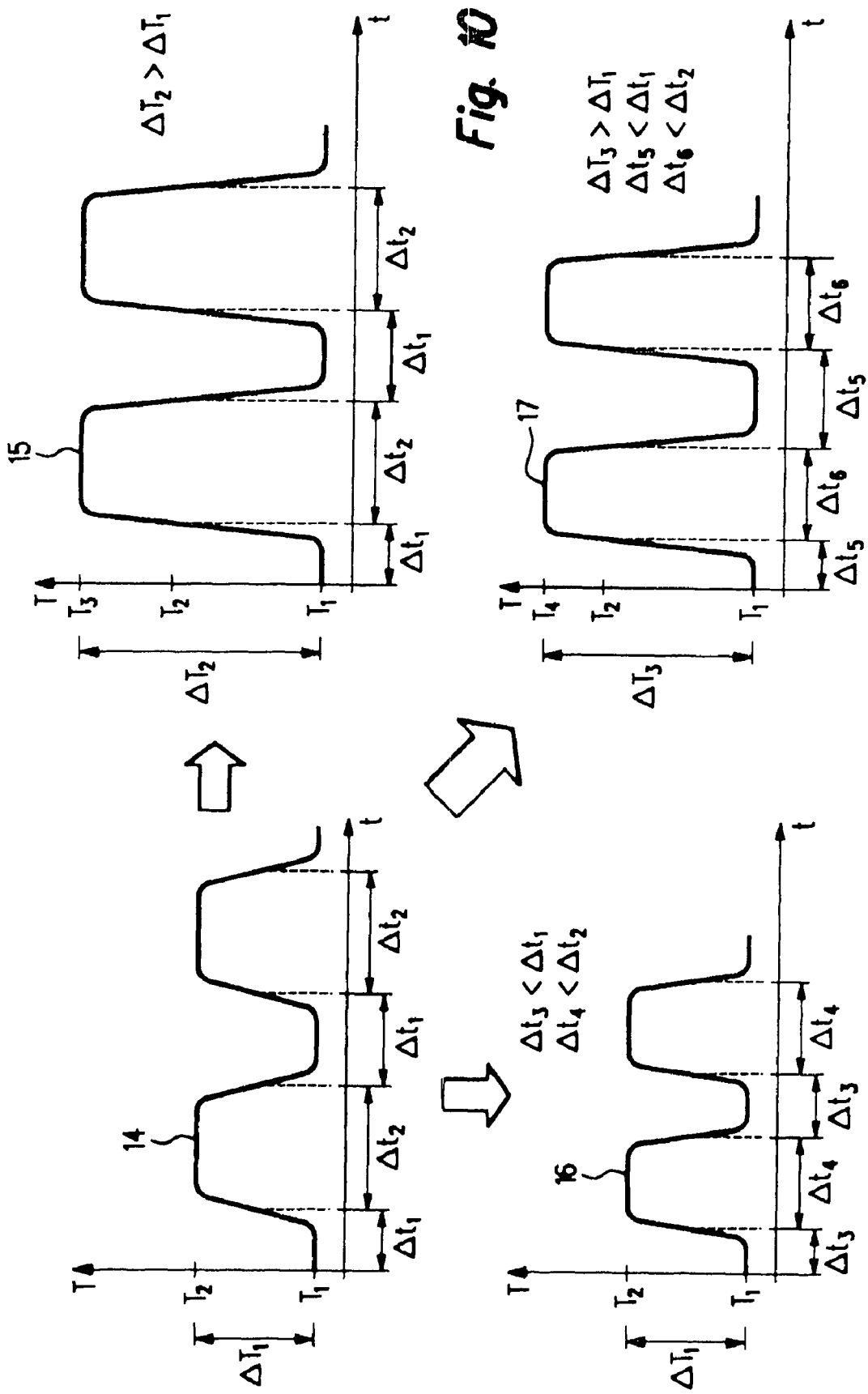
FIG. 10 illustrates realistic acceleration of the testing of a product at equal acceleration factors for a thermal and for a thermomechanical loading.

In FIG. 10, a specific loading profile to which a finished product is subjected over its entire service life is denoted by reference numeral 14. Loading profile 14 is either estimated or simulated, or is plotted under realistic conditions. In the simplified exemplary embodiment illustrated here, loading profile 14 includes relatively short time periods $\Delta t_1$ during which a relatively low loading $T_1$ is applied. In addition, loading profile 14 includes longer time periods $\Delta t_2$ during which a higher loading $T_2$ is applied. Loading profile 14 thus includes a load change $\Delta T_1$ periodically recurring at a specific frequency $(1/(\Delta t_1 + \Delta t_2))$. The loading of the product with loading profile 14 results in both a thermal loading and a thermomechanical loading of the product, thermal and thermomechanical loading having a specific relationship to one another. For example, the thermal loading takes place in the form of recrystallization or diffusion at the product. The thermomechanical loading has its origin primarily in different coefficients of thermal expansion of the materials and components of the product (so-called TCE mismatch).

Reference numeral 15 denotes an accelerated loading profile, which, in the simplified exemplary embodiment illustrated here, encompasses the relatively short time periods $\Delta t_1$ during which relatively low load $T_1$ is applied. In addition, loading profile 15 includes longer periods of time $\Delta t_2$, during which a higher load is applied that is greater than load $T_2$ of first loading profile 14. In this manner, the frequency of the loading fluctuations does remain the same as that of first loading profile 14, but a load change $\Delta T_2$ is produced that is greater than in the case of first loading profile 14 ($\Delta T_2 > \Delta T_1$). Therefore, loading profile 15 includes a greater load change $\Delta T_2$ periodically recurring at a specific frequency $(1/(\Delta t_1 + \Delta t_2))$. Accelerated loading profile 15 results in the thermal loading being overemphasized in comparison with the thermomechanical loading. The resulting acceleration factor of the thermal loading or the degree of increase in the failure probability due to the thermal loading of loading profile 15 may be calculated according to the Arrhenius rule.

Reference numeral 16 in FIG. 10 denotes an additional accelerated loading profile, which includes, in the simplified exemplary embodiment shown here, relatively short periods of time $\Delta t_3$, during which relatively small load $T_1$ is applied. Period of time $\Delta t_3$ is shorter that period of time $\Delta t_1$ of loading profiles 14 and 15. In addition, loading profile 16 includes longer periods of time $\Delta t_4$, during which higher load $T_2$ is applied. Period of time $\Delta t_4$ is less than period of time $\Delta t_2$ of loading profiles 14 and 15. In this manner, loading fluctuations $\Delta T_1$ do remain unchanged with respect to loading profile 14, but the test is temporally accelerated, so that loading profile 16 includes a load change $\Delta T_1$ periodically recurring at a higher frequency $(1/(\Delta t_3 + \Delta t_4))$. Accelerated loading profile 16 results in the thermomechanical loading being overemphasized in comparison with the thermal loading. The resulting acceleration factor of the thermomechanical loading or the degree of increase in the failure probability due to the thermomechanical loading of loading profile 16 may be calculated according to the Coffin-Manson rule.

In order to produce a reliability verification, actual loading profile 14 cannot be run through completely for reasons of time. For this reason, accelerated tests (cf. loading profiles 15 and 16) are used in which the loading is increased and the duration of the test is correspondingly decreased. In order to additionally achieve as realistic as possible a simulation of the actual loading of the product over its life cycle during accelerated tests, example embodiments of the present invention provide for an accelerated reliability verification to be produced at a specific temperature $T_4$ above a specifiable field loading $T_2$ of the product, for a specific period of time $\Delta t_6$ less than period of time $\Delta t_2$ of field loading $T_2$. In so doing, elevated temperature $T_4$ and shortened period of time $\Delta t_6$ are adjusted to each other in such a manner, that a mechanical loading of the product and a thermomechanical loading of the product are accelerated by approximately the same factor. Of course, this method may not only be used for absolute loadings (e.g., temperature $T_i$), but also for loading cycles or load changes (e.g., temperature changes $\Delta T_i$). In this case, an accelerated reliability verification is then carried out at a specific temperature change $\Delta T_3$ greater than a specifiable field loading $\Delta T_1$ of the product, at a specific frequency $1/(+\Delta t_6)$ greater than frequency $1/(\Delta t_1 + \Delta t_2)$ of field loading $\Delta T_1$. In this context, increased temperature change $\Delta T_3$ and greater frequency $1/(+\Delta t_6)$ are adjusted to one another in such a manner, that a mechanical loading and a thermomechanical loading of the product are accelerated by approximately the same factor.

The resulting acceleration factor for the thermal loading is initially ascertained according to Arrhenius for an increased temperature $T_4$ or an increased temperature change $\Delta T_3$. Using the ascertained acceleration factor for the thermal loading, the resulting, reduced period of time, $\Delta t_6$ or increased frequency $1/(+\Delta t_6)$ is then ascertained for the test, according to Coffin-Manson, in such a manner, that the acceleration factor for the thermomechanical loading is approximately equal to the acceleration factor for the thermal loading.

The method of example embodiments of the present invention allows the testing times to be shortened and the product costs to be reduced. In addition, the reliability may be increased. Furthermore, precise predictions may be made regarding the expected lifetime of one component or the entire product. The test conditions are selected to be as close to field conditions as possible, in order to be able to actually represent the correlation with the product. The generation of failure diagrams, which cannot occur in the field, is prevented as much as possible.

A substantial advantage of example embodiments of the present invention is the implementation of tests under conditions similar to field conditions, in which, at different temperatures T and temperature changes $\Delta T$, components or structural elements are operated until failure and the failure mechanisms are analyzed and correlated with predetermined curve shapes and functions. The test criteria are selected to correspond to field conditions, in order to ensure the correlation with the actual field loading (in actual use).

In this context, after the end of the test, the termination criteria may be dynamically adjusted and set to the respective location of application and must not be known a priori. This allows the products to be designed in a cost-effective, product-specific manner, with simultaneously increased reliability and a sufficient expected lifetime. So-called over-engineering or underengineering may be prevented. The delivery quality of the products may be simultaneously improved by avoiding recursions.

In the case of a high field loading, the method of example embodiments of the present invention allows an insufficient design of the products to be reliably prevented. Due to the scalability (measurements previously undertaken and tabulation of the testing conditions), the reliability verification may be carried out within a suitably short period of time, without having to conduct tests oneself on the new product. The described, highly simplified tests on prototypes are sufficient.

Figure 4:
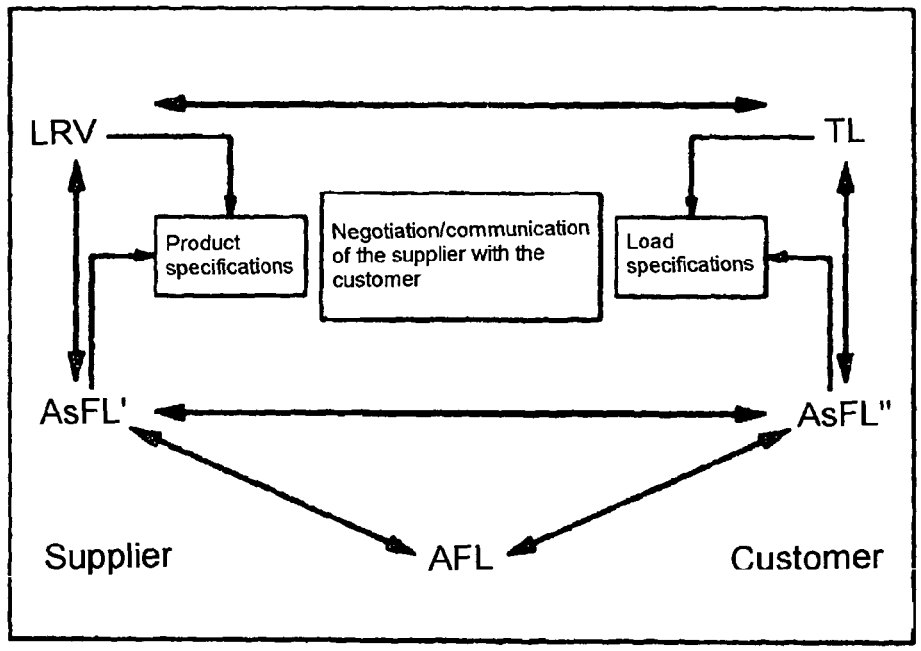
FIG. 4 illustrates possible communication paths between supplier and customer rendered possible by example embodiments of the present invention.

Effective communication between a supplier and customers may be conducted on the basis of example embodiments of the present invention. An example of the communication sequences is shown in FIG. 4. During normal operation of a product, it is subjected to an actual field loading (AFL), which is an objectively determinable variable and is therefore the same in the view of the suppliers and in the view of the customers. However, actual field loading AFL is not yet known prior to the introduction of the product, i.e. at the time of developing the product. Starting out from expected, actual field loading AFL, the supplier ascertains an assumed field loading $AsFL_1$, which may differ markedly from an assumed field loading 1 ascertained by the customer. This is caused by the fact that the supplier and the customer normally pursue different objectives. While the customer (e.g., an automobile manufacturer) desires the highest possible quality and therefore starts out from a relatively high, assumed field loading $AsFL_2$, both quality requirements and low costs are in the fore in the case of the supplier, which means that the supplier will normally start out from a lower, assumed field loading $AsFL_1$. The reason for the different assumed field loadings AsFL is, in particular, the fact that during product development, actual field loading AFL for the product in the field is still unknown.

Loading 12 in reliability verification LRV is ascertained in view of assumed field loading $AsFL_1$ of the supplier. The determination of this loading 12 in the manner represented in FIG. 6 and described above may be optimized, so that optimum loading 12 is obtained during reliability verification LRV.

From assumed field loading $AsFL_2$, the customer determines a test loading TL, which is required by him, and which, from the viewpoint of the customer, the product must withstand for ensuring a predefined quality standard. As a rule, test loading TL required by the customer is also greater than the loading ascertained by the supplier during reliability verification LRV. Up to this point, the supplier has not had any arguments as to why loading 12 ascertained by the supplier in reliability verification LRV is completely sufficient for the product to satisfy the quality requirements demanded by the customer; if the product were also to withstand test loading TL specified by the customer, the product would possibly be overdimensioned.

With the aid of example embodiments of the present invention, the supplier is now provided with a mechanism, by which he can present comprehensible and reconstructable arguments to the customer as to why loading 12 ascertained according to the method of FIG. 6 in reliability verification LRV is completely sufficient for producing the reliability verification.

The end-of-life of structural elements or components is determined by measuring and monitoring observables (observable variables). In the case of an active component, examples of these could include the delamination of mold compound or bond fatigue. Further examples are compiled in the following list. Of course, further observables are possible.

In the following, several failure diagrams are described using their observables (observable variables). In the case of active components (e.g., an integrated circuit IC, an operational amplifier OP, a microprocessor, a microcontroller, a MOSFET, etc.), an example of this is the delamination of a so-called mold compound, which may be detected with the aid of ultrasonics. In addition, it could be bond fatigue, or an increase in a thermal resistance $Z_{th}$, an increase in current $I_{subthreshold}$, or an increase in internal resistance $R_{on}$.

In the case of passive components (e.g., an ohmic resistor, an inductance coil, or a capacitor, etc.), e.g., the capacitance, power-loss factor tan α, or a series electrical resistance ESR may be an observable variable; as well as dielectric resistance $R_{iso}$ at −40, +25, +125, and +150° Celsius or other freely selectable temperatures. In the same manner, failure modes could be detected via optical inspection or via drift evaluation of characteristic curves.

In the case of printed circuit boards, a measurement of resistance, e.g., dielectric resistance $R_{iso}$, may be conducted. In the same way, delamination, cracks in the insulation enamel, or cracks in the fiberglass structure may be detected in an optical manner.

In the case of packaging P (e.g., while soldering), a resistance measurement, a shear-force measurement, or an x-ray test may be conducted for ascertaining typical failure modes. In addition, it is possible to grind down the bonding site and detect failure modes in this manner.

The reliability tests must be oriented towards the types of loading occurring in the field, in which passive heating, active heating, and pulse loads may occur. In the following, these types of loading are explained, and the test procedures by which these loadings may be simulated are exemplarily shown.

Passive Heating:

This is caused, for example, by temperature changes during vehicle operation in a motor vehicle. These loadings may be simulated in a single-chamber temperature change system (at, e.g., +5 K/min).

Active Heating:

This is caused by a medium power loss, e.g. of a semiconductor, during vehicle operation. The experimental simulation is done by actively heating the component at 0.1 to 0.001 Hz (period of 10 to 1000 seconds) and a power loss of 5 to 10 W. The active heating is superimposed on the passive heating.

Pulse Loads:

These cause a temperature change at frequencies between 1 and 50 Hz (period of 20 ms to 1 second) as a result of switching operations having short-term power losses of up to a few hundred Watts. The experimental simulation is carried out, using pulsed operation of the components. The pulsed operation may be superimposed on the passive and active heating.

For reasons of simplification and better reproducibility of the reliability verification, the operation of the components during the verification is limited to periodic events and fixed cutoff temperatures. Of course, varying temperatures and temperature changes may be nested in one another. Two cutoff temperatures $T_{low}$ und $T_{high}$ similar to conditions in the field are selected for this purpose. In the case of lower cutoff temperature $T_{low}$, the mean minimum temperature in Winter is averaged across highly populated regions having a high concentration of motor vehicles to yield −15° Celsius. For example, 100, 125, 150, 175 and 200° Celsius are selected as upper cutoff temperatures $T_{high}$ for the different EOL tests.

In contrast to many standard test methods, these tests are carried out using slow temperature changes since they are chiefly caused by passive heating. The retention times for lower cutoff temperature $T_{low}$ are limited to a minimum if there are no low-temperature failure modes. At the above-mentioned cutoff temperatures $T_{high}$, the failure mechanisms already known (e.g., solder creep, diffuse mass transport, etc.) must always be taken into account in the design of the retention times. This may also lead to different retention times being necessary for different failure mechanisms. For example, it is possible for upper cutoff temperatures $T_{high}$ to be present for 15 or also 60 minutes.

The following results may be obtained from EOL curves 8 for the components:
  only mechanisms relevant to field conditions are covered;
  a failure distribution; and
  the failure time (N 63%).
The evaluation of EOL curves 8 of the components yields:
  a determination of the activation energies;
  a determination of Coffin-Manson coefficients;
  a determination of the correlation between a trial close to field conditions and a standard trial; and
  product-specific designs using variable failure criteria.
Example embodiments of the present invention may provide the following advantages:
  shorter development time for the products;
  avoidance of recursions in the development of products;
  no over-engineering: in each instance, the most suitable components, technologies, and structural elements may be selected;
  a specific product may also be offered for higher technical application profiles, when its components are designed to be sufficiently rugged and durable; and
  only failure mechanisms relevant to field conditions are covered.

While the production of a reliability verification for a specific product according to conventional systems may take up to one year, example embodiments of the present invention may allow the same reliable and representative assertions to be made already after only a few hours. Example embodiments of the present invention also allow more effective customer relationships to be built up, since central questions and problems regarding the service life and design of components and products may be responded to more rapidly. In addition, the end-of-life testing allows the technological limits of the products and components to be explicitly shown. It is possible to accelerate the testing, the acceleration factors (from the field and laboratory) being able to be precisely determined. An estimation of service life may be made as well, the service life of the components being directly given by end-of-life curve 8, and the service life of the entire product being able to be determined on the basis of EOL curve 11 for the product.

The acquired results may be used in the development departments of the supplier or customer for:
  more effectively utilizing, and estimating the reliability of, the components and products;
  designing the components and products in an application-specific manner; and
  optimally characterizing future developments.

In addition, sound risk analyses in cases of emergency and special releases for specific products and components are possible. Specific service-life models of the products may be constructed, so that improved and more reliable service-life models are available for simulation.

Example embodiments of the present invention are explained in detail within the scope of a high-temperature application. However, it is also applicable to all other reliability verifications for "normal" temperatures, mechanical loading, and loading by moisture and/or chemicals.

Figure 11:
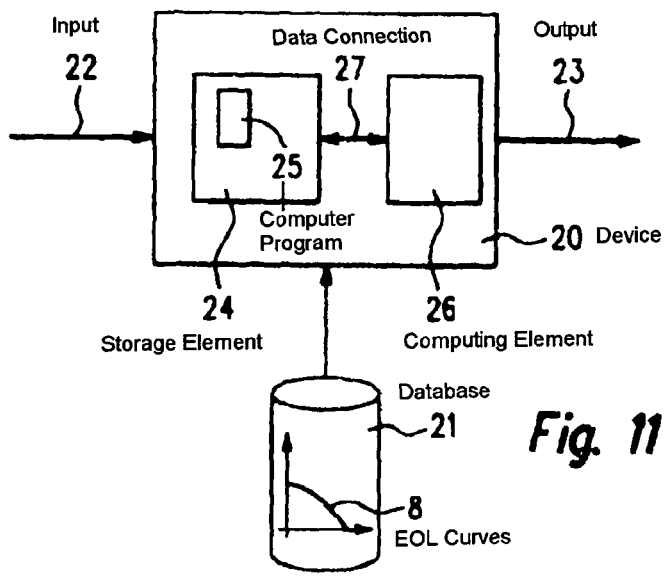
FIG. 11 illustrates a device for executing the method according to example embodiments of the present invention.

In FIG. 11, a device of an example embodiment of the present invention is denoted by reference numeral 20. EOL curves 8 for many different components from a database 21 are available in device 20. Database 21 may be connected to device 20 directly or via a client-server network, e.g., the Internet. Device 20 may access desired EOL curves 8 in database 21 and load desired EOL curves 8 completely or partially.

A specifiable collective loading or loading profile for a particular component or a particular product is applied to an input 22 of device 20. The applied loading profile is, for example, assumed field loading $AsFL_1$ and, in some instances, an additional loading 3 in the sense of FIGS. 2 and 3. An output signal, which supplies information regarding the reliability and/or the service life of a particular component or the entire product, is applied to an output 23 of device 20. While the reliability verification only delivers "yes" or "no" results, i.e., the component or the product can or cannot produce the verification, the service life provides an exact statement regarding the durability of the component or the product. The service life supplies, for example, a value in hours or a number of cycles, after which the component or the product will probably fail if it is acted upon by a predefined loading.

It is possible for EOL curves 8 for the different components to be recorded by the manufacturers and suppliers of the components and supplied to the customers together with the product, e.g., as additional information on a data sheet or as information retrievable via the Internet. With the aid of device 20, the customer may then assemble any products from the available components and determine, for these components, a corresponding EOL curve 11 for the product from EOL curves 8 of the components. With the aid of the provided or independently determined, assumed field loading 1 (AsFL) and additional field loading 3, it can be checked if the product satisfies the requirements, using a specified loading 2 during the reliability verification or a previously determined, optimum loading 12 during the reliability verification.

A storage element 24, which may take the form of a flash memory, is provided in device 20. A computer program 25, which may be executed on a computing element 26 of device 20, is stored in storage element 24. Computing element 26 may take the form of a microcontroller or a microprocessor. To execute computer program 25 on computing element 26, it is transmitted as instructed, or in its entirety, to computing element 26 via a data connection 27. Data ascertained within the scope of executing computer program 25 may be transmitted in the reverse direction, via data connection 27, from computing element 26 to storage element 24, and stored there.

When computer program 25 is executed on computing element 26, it implements the method hereof. In the represented exemplary embodiment, the computer program executes, in particular, the following method steps:
  an EOL curve 11 for a particular product is ascertained in view of EOL curves 8 from database 21, so that in the case of different loadings T, ΔT, EOL curve 11 includes the one of the EOL curves 8 of the components loaded into the device, which has, in each instance, the shortest failure time t, N at corresponding loading T, ΔT; and
  the anticipated service life of the product is ascertained as a functional value of EOL curve 11 of the product, as a function of loading 1, 3 of the product, specified at input 22.

In addition, another reliability verification may be produced for the product by checking if EOL curve 11 of the product is above a loading 2; 12 specified at input 22 for specifiable period of time t; N, and if this is so, the reliability verification for the product is considered to be produced.

In the preliminary stages of executing computer program 25 on computing element 26, the following additional method steps may be executed for ascertaining EOL curves 8 for components K1 through Kn:
  components K1 through Kn of the product are acted upon by a specifiable loading T, ΔT;
  components K1 through Kn are each operated at different loadings T, ΔT until they fail;

obtained failure times t, N are stored for respective components K1 through Kn as a function of loading T, ΔT;

as a function of load-dependent failure times t, N of a component K1 through Kn, a corresponding end-of-life (EOL) curve 8 of component K1 through Kn is plotted and stored in database 21.

The above-described interpolations between the points of reference of EOL curves 8 and extrapolations beyond the points of reference are likewise possible.

What is claimed is:

1. A method for predicting a life expectancy of a product, having at least two components, as a function of a predefined loading of the product, comprising:

acting upon the components of the product by different loadings;

operating each component at the different loadings until failure;

storing obtained failure times for each component as a function of each of the loadings;

recording a corresponding end-of-life (EOL) curve of each component as a function of the load-dependent failure times of the component;

ascertaining an EOL curve of the product, so that at each of the different loadings, it includes the EOL curve of a component which has a shortest failure time at the corresponding loading; and determining an anticipated service life of the product as a functional value of the EOL curve of the product as a function of the predefined loading of the product;

wherein the components of the product are loaded by at least one of (a) a specific, absolute operating temperature and (b) a temperature fluctuation of a particular amplitude within a specific period of time, and wherein the different loadings are in a number of loading classes, and for each loading class a distance of a duration of a predefined loading of a component to a corresponding value on the EOL curve of the component is determined and summed up according to Palmgren-Miner.

2. The method according to claim 1, wherein the method is used for producing a reliability verification for the product by checking if the EOL curve of the product is above a specifiable loading for a specifiable period of time, and if this is so, the reliability verification for the product is considered to be produced.

3. The method according to claim 1, wherein the EOL curves of the components are extrapolated to lower loadings.

4. The method according to claim 1, wherein the EOL curves of the components are interpolated between discrete values of the failure times at the different loadings at which the EOL curves are recorded.

5. A method for predicting a life expectancy of a product, having at least two components, as a function of a predefined loading of the product, comprising:

acting upon the components of the product by different loadings;

operating each component at the different loadings until failure;

storing obtained failure times for each component as a function of each of the loadings;

recording a corresponding end-of-life (EOL) curve of each component as a function of the load-dependent failure times of the component;

ascertaining an EOL curve of the product, so that at each of the different loadings, it includes the EOL curve of a component which has a shortest failure time at the corresponding loading; and determining an anticipated service life of the product as a functional value of the EOL curve of the product as a function of the predefined loading of the product;

wherein the components of the product are loaded by at least one of (a) a specific, absolute operating temperature and (b) a temperature fluctuation of a particular amplitude within a specific period of time, and wherein within the scope of a thermal loading of the product, an accelerated reliability verification is conducted at a specific temperature above a specifiable field loading, for a specific period of time less than a duration of a field loading; the specific temperature and the specific period of time being adjusted to one another such that a mechanical loading of the product and a thermomechanical loading of the product are accelerated by approximately the same factor.

6. The method according to claim 1, wherein an EOL curve of a component includes at least two points that result from the failure times of the component at different loadings.

7. A device for predicting a life expectancy of a product, that includes at least two components, as a function of a predefined loading of the product, comprising:

a device configured to retrieve stored end-of-life (EOL) curves of at least two of the components of the product, the EOL curves having been recorded beforehand as a function of ascertained, load-dependent failure times of the components;

a device configured to ascertain an EOL curve of the product, so that at different loadings, it includes the EOL curve of a component which has a shortest failure time at the corresponding loading; and a device configured to determine an anticipated service life of the product as a functional value of the EOL curve of the product as a function of the predefined loading of the product;

wherein the components of the product are loaded by at least one of (a) a specific, absolute operating temperature and (b) a temperature fluctuation of a particular amplitude within a specific period of time, and wherein the different loadings are in a number of loading classes, and for each loading class a distance of a duration of a predefined loading of a component to a corresponding value on the EOL curve of the component is determined and summed up according to Palmgren-Miner.

8. The device according to claim 7, wherein the EOL curves of the at least two components have been recorded by a manufacturer of each component.

9. The device according to claim 7, wherein the device is configured to produce a reliability verification for the product and includes a device configured to check if the EOL curve of the product is above a specifiable loading for a specifiable period of time, and if this is so, the reliability verification for the product is considered to be produced.

10. A non-transitory computer-readable storage medium for storing a computer program having a plurality of program codes for implementing, when the program codes are executed on a computer, a method for predicting a life expectancy of a product, having at least two components, as a function of a predefined loading of the product, the method including:

acting upon the components of the product by different loadings;

operating each component at the different loadings until failure;

storing obtained failure times for each component as a function of each of the loadings;

recording a corresponding end-of-life (EOL) curve of each component as a function of the load-dependent failure times of the component;

ascertaining an EOL curve of the product, so that at each of the different loadings, it includes the EOL curve of a component which has a shortest failure time at the corresponding loading; and determining an anticipated service life of the product as a functional value of the EOL curve of the product as a function of the predefined loading of the product;

wherein the components of the product are loaded by at least one of (a) a specific, absolute operating temperature and (b) a temperature fluctuation of a particular amplitude within a specific period of time, and wherein the different loadings are in a number of loading classes, and for each loading class a distance of a duration of a predefined loading of a component to a corresponding value on the EOL curve of the component is determined and summed up according to Palmgren-Miner.

11. A method for predicting a life expectancy of a product, having at least two components, as a function of a predefined loading of the product, comprising:

acting upon the components of the product by different loadings;

operating each component at the different loadings until failure;

storing obtained failure times for each component as a function of each of the loadings;

recording a corresponding end-of-life (EOL) curve of each component as a function of the load-dependent failure times of the component;

ascertaining an EOL curve of the product, so that at each of the different loadings, it includes the EOL curve of a component which has a shortest failure time at the corresponding loading; and determining an anticipated service life of the product as a functional value of the EOL curve of the product as a function of the predefined loading of the product;

wherein the method is used for producing a reliability verification for the product by checking if the EOL curve of the product is above a specifiable loading for a specifiable period of time, and if this is so, the reliability verification for the product is considered to be produced, wherein the components of the product are loaded by at least one of (a) a specific, absolute operating temperature and (b) a temperature fluctuation of a particular amplitude within a specific period of time, wherein the different loadings are in a number of loading classes, and for each loading class a distance of a duration of a predefined loading of a component to a corresponding value on the EOL curve of the component is determined and summed up according to Palmgren-Miner.

12. The method according to claim 11, wherein within the scope of a thermal loading of the product, an accelerated reliability verification is conducted at a specific temperature above a specifiable field loading, for a specific period of time less than a duration of a field loading; the specific temperature and the specific period of time being adjusted to one another such that a mechanical loading of the product and a thermo-mechanical loading of the product are accelerated by approximately the same factor.

13. The method according to claim 11, wherein the EOL curves of the components are at least one of (i) extrapolated to lower loadings, and (ii) interpolated between discrete values of the failure times at the different loadings at which the EOL curves are recorded, and wherein an EOL curve of a component includes at least two points that result from the failure times of the component at different loadings.

14. The method according to claim 13, wherein within the scope of a thermal loading of the product, an accelerated reliability verification is conducted at a specific temperature above a specifiable field loading, for a specific period of time less than a duration of a field loading; the specific temperature and the specific period of time being adjusted to one another such that a mechanical loading of the product and a thermo-mechanical loading of the product are accelerated by approximately the same factor.

* * * * *